US012662260B2

(12) United States Patent
Rennó

(10) Patent No.: US 12,662,260 B2
(45) Date of Patent: Jun. 23, 2026

(54) METHOD FOR DETECTION OF NON-THERMAL RADIATION BY COLLIDING DEBRIS

(71) Applicant: The Regents of The University of Michigan, Ann Arbor, MI (US)

(72) Inventor: Nilton O. Rennó, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 78 days.

(21) Appl. No.: 18/734,632

(22) Filed: Jun. 5, 2024

(65) Prior Publication Data

US 2024/0409244 A1 Dec. 12, 2024

Related U.S. Application Data

(60) Provisional application No. 63/471,373, filed on Jun. 6, 2023.

(51) Int. Cl.
*B64G 3/00* (2006.01)
*G01S 11/12* (2006.01)
(52) U.S. Cl.
CPC ............... *B64G 3/00* (2013.01); *G01S 11/12* (2013.01)
(58) Field of Classification Search
None
See application file for complete search history.

(56) References Cited

U.S. PATENT DOCUMENTS

| | | | |
|---|---|---|---|
| 8,193,968 B1 | 6/2012 | Kia et al. | |
| 9,916,507 B1 | 3/2018 | Freedman et al. | |
| 10,228,323 B1 * | 3/2019 | Hart ................... | G01N 21/1702 |
| 2021/0011148 A1 | 1/2021 | Blondel et al. | |

(Continued)

FOREIGN PATENT DOCUMENTS

| | | |
|---|---|---|
| CN | 102096273 A | 6/2011 |
| EP | 0284075 A2 | 9/1988 |

OTHER PUBLICATIONS

Xiongjun. Fu, Guoman. Liu and Meiguo. Gao, "Overview of orbital debris detection using spaceborne radar," 2008 3rd IEEE Conference on Industrial Electronics and Applications, Singapore, 2008, pp. 1071-1074, doi: 10.1109/ICIEA.2008.4582681. (Year: 2008).*

(Continued)

*Primary Examiner* — Daniel L Greene
(74) *Attorney, Agent, or Firm* — Harness, Dickey & Pierce, PLC

(57) ABSTRACT

A system and method for detecting space debris which is based on measurements of broadband non-thermal radiation and/or light emitted by either sparks or the expansion of the plasma-fragments cloud generated during high-speed collisions of solid materials. The method is based on the concept that broadband nonthermal radiation and/or light can be used to detect the formation of new debris and for tracking debris clouds. The emission of broadband nonthermal radiation and/or light is based on theoretical and observational evidence that the collision of particles of solid materials with each other transfer enough charge to create electric fields large enough to produce small electric discharges or sparks and that the expansion of the plasma-fragments cloud generated by collisions at orbital velocities produce thermal and non-thermal electromagnetic signals.

10 Claims, 4 Drawing Sheets

10 —

(56)　　　　　References Cited

U.S. PATENT DOCUMENTS

2024/0185438 A1 *　6/2024　Montanaro ............. G06T 7/248
2024/0302562 A1 *　9/2024　Bucklew .................. B64G 1/68

OTHER PUBLICATIONS

Tingay, S. J. et al. "On the detection and tracking of space debris using the Murchison Widefield Array. I. Simulations and test observations demonstrate feasibility" Published Sep. 16, 2013. The American Astronomical Society. (Year: 2013).*

Benz, Willy, Christopher Broeg, Andrea Fortier, Nicola Rando, Thomas Beck, Mathias Beck, Didier Queloz et al. "The CHEOPS mission." Experimental Astronomy 51 (2021): 109-151.

Close, Sigrid, Ivan Linscott, Nicolas Lee, Theresa Johnson, David Strauss, Ashish Goel, Alexander Fletcher et al. "Detection of electromagnetic pulses produced by hypervelocity micro particle impact plasmas." Physics of Plasmas 20, No. 9 (2013).

Goel, A., N. Lee, and S. Close. "Estimation of hypervelocity impact parameters from measurements of optical flash." International Journal of Impact Engineering 84 (2015): 54-63.

Johns, Matt, Patrick McCarthy, Keith Raybould, Antonin Bouchez, Arash Farahani, Jose Filgueira, George Jacoby, Steve Shectman, and Michael Sheehan. "Giant magellan telescope: overview." Ground-based and Airborne Telescopes IV 8444 (2012): 526-541.

Renno, Nilton O., Ah-San Wong, Sushil K. Atreya, Imke de Pater, and Maarten Roos?Serote. "Electrical discharges and broadband radio emission by Martian dust devils and dust storms." Geophysical research letters 30, No. 22 (2003).

Renno, Nilton O., and Christopher S. Ruf. "Comments on the search for electrostatic discharges on Mars." The Astrophysical Journal 761, No. 2 (2012): 88.

Renno, Nilton O., Yun Zhang, Mojtaba Akhavan-Tafti, Tsige Atilaw, and Erik Fischer (2024). Using Non-Thermal Electromagnetic Radiation to Track and Characterize Space Debris. ICEAA-IEEE APWC 2024, Lisboa, Portugal, Sep. 2-6, 2024.

Ruf, Christopher, Nilton O. Renno, Jasper F. Kok, Etienne Bandelier, Michael J. Sander, Steven Gross, Lyle Skjerve, and Bruce Cantor. "Emission of non-thermal microwave radiation by a Martian dust storm." Geophysical research letters 36, No. 13 (2009).

Ruf, Christopher S., Steven M. Gross, and Sidharth Misra. "RFI detection and mitigation for microwave radiometry with an agile digital detector." IEEE transactions on geoscience and remote sensing 44, No. 3 (2006): 694-706.

De Roo, R., S. Misra, and C. Ruf, Sensitivity of the kurtosis statistic as a detector of pulsed sinusoidal RFI, IEEE Trans. Geosci. Remote Sens., 45, 1938-1946, (2007).

Bernhard, A. K., K. Sattler, and H. C. Siegmann, Gas breakdown in contact electrification, J. Phys. D., 25, 139-146, (1992).

International Search Report and Written Opinion of the ISA issued in PCT/US2024/032713, mailed Sep. 24, 2024; ISA/KR.

* cited by examiner

Elapsed time (sec)

METHOD FOR DETECTION OF NON-THERMAL RADIATION BY COLLIDING DEBRIS

CROSS-REFERENCE TO RELATED APPLICATIONS

This application claims the benefit of U.S. Provisional Application No. 63/471,373, filed on Jun. 6, 2023. The entire disclosure of the above application is incorporated herein by reference.

FIELD

The present disclosure relates to space debris and, more particularly, relates to methods and systems for remotely detecting and tracking colliding space debris.

BACKGROUND AND SUMMARY

This section provides background information related to the present disclosure which is not necessarily prior art. This section provides a general summary of the disclosure, and is not a comprehensive disclosure of its full scope or all of its features.

Collisions with orbital debris are a significant risk to any Earth-orbiting spacecraft. At velocities of about 10 km/s in low Earth orbit (LEO), even tiny debris, such as paint chips, can cause serious damage because of their large kinetic energy. Today there are more than 500,000 space debris with cross section ranging from 1 to 10 cm, and over 100 million debris smaller than 1 cm orbiting the Earth. Since debris poses a risk to any space mission, methods for detecting and tracking the debris is of paramount importance to the safety of space missions. The present disclosure provides a method for detecting and tracking colliding space debris remotely.

According to an aspect of the present disclosure, a method for detecting and tracking colliding space debris includes measuring electromagnetic radiation generated by the space debris colliding with each other and outputting an electromagnetic radiation signal. The electromagnetic radiation signal is processed to distinguish it from other signals such as radio frequency interference (RFI) and outputting a detection signal. The detection signal is used to track the space debris.

According to another aspect of the present disclosure, processing the electromagnetic radiation signal includes calculating a power spectrum of the emission and using the power spectrum to detect and track the space debris.

According to another aspect of the present disclosure, processing the electromagnetic radiation signal includes calculating a kurtosis of the emission and using the kurtosis to detect and track the space debris.

According to another aspect of the present disclosure, measuring electromagnetic radiation generated by the space debris colliding with each other is detected by an antenna.

According to another aspect of the present disclosure, the detection signal is used to estimate a size of the space debris.

According to an aspect of the present disclosure, a method for detecting and tracking colliding space debris includes measuring optical light generated by the space debris colliding with each other or with larger objects and outputting an optical signal. The optical signal is processed to distinguish it from other signals and a detection signal is output. The detection signal is used to track the space debris.

According to another aspect of the present disclosure, processing the optical signal includes detecting at least one of visible, infrared and UV light.

According to another aspect of the present disclosure, processing the optical signal includes calculating a kurtosis of the detection signal and using the kurtosis to detect and track the space debris.

According to another aspect of the present disclosure, measuring optical light generated by the space debris colliding with each other is detected by a telescope.

According to another aspect of the present disclosure, the detection signal is used to estimate a size of the space debris.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected methods or embodiments and not all possible implementations, and are not intended to limit the scope of the present disclosure.

(FIG. 2A) Observations of kurtosis at eight spectral bands (8470-8472.5, 8472.5-8475, . . . , 8487.5-8490 MHZ). (FIG. 2B) Observations of spectral kurtosis at eight spectral bands (3190.1-3192.4 3192.5-3194.9, 3195-3197.3, 3197.4-3199.8, 3200.2-3202.6, 3202.7-3205.0, 3205.1-3207-5, 3207.6-3210.0). Deviations from 3 (FIG. 2B) and 1 (FIG. 2A) indicate the presence of a signal with non-Gaussian amplitude distribution. The broadband signal shown in FIG. 2A corresponds to NTEM radiation by colliding dust particles, while the sharper signal in only a few bands shown in FIG. 2B corresponds to RFI.

Corresponding reference numerals indicate corresponding parts throughout the several views of the drawings.

DETAILED DESCRIPTION

Figure 1A:
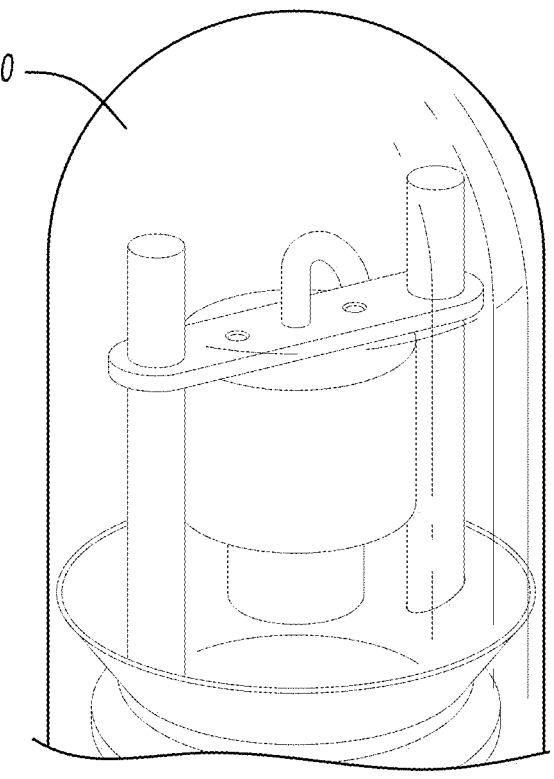
FIGS. 1A-1B illustrate non-thermal radiation (NTEM) emitted by colliding particles in a bell jar. It indicates that the kurtosis is a good indicator of the emission of non-thermal radiation. The expansion of the plasma-fragments cloud generated by orbital collisions at hypervelocity produce multiple signals, including NTEM ranging from radio to optical wavelengths, thermal radiation (TEM), and NTEM ultraviolet (UV) radiation.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Contact electrification during collisions of space debris and the expansion of the plasma-fragments cloud generated by collisions at hypervelocity generates broadband non-thermal electromagnetic (NTEM) radiation like that generated by colliding particles of dust and other solid materials. In addition, the expansion of the plasma-fragments cloud generated by orbital collisions at hypervelocity produce other signals, such as NTEM at ultraviolet (UV) and optical wavelengths, and thermal radiation (TEM). A method for detecting clouds of space debris by measuring these signals, in particular the broadband NTEM radiation emitted by colliding debris is provided. This method is based on observational evidence that the collision of particles of solid materials with each other or larger objects transfer enough charge to create electric fields capable of producing both field emission and electric discharges. Electric discharges either in the plasma or along the particles surfaces generates broadband non-thermal radiation, while the expansion of the plasma-fragments cloud generated by collisions at orbital velocities produce multiple signals, including NTEM ranging from radio to optical wavelengths, NTEM ultraviolet (UV) radiation, and thermal radiation (TEM) (e.g., Close et al., 2013; Goel et al., 2015; Renno et al., 2024). The kurtosis of the electromagnetic radiation signal allows the detection of NTEM radiation with higher sensitivity than power and allows the fingerprinting of the non-thermal radiation caused by debris collisions.

Accordingly, the present teachings provide a system and a method for detecting colliding space debris and tracking clouds containing colliding space debris. The colliding debris are detected by measuring broadband nonthermal radiation emitted by sparks generated during high-speed collisions in space. This method is based on observational evidence that the collision of particles of solid materials with each other or with larger objects transfer enough charge to create electric fields large enough to produce field emission and electric discharges, and that the expansion of the plasma-fragments cloud generated by collisions at orbital velocities produce multiple signals, including NTEM ranging from radio to optical wavelengths, thermal radiation (TEM), and NTEM ultraviolet (UV) radiation as illustrated in FIGS. 1A-1B.

Figure 1B:
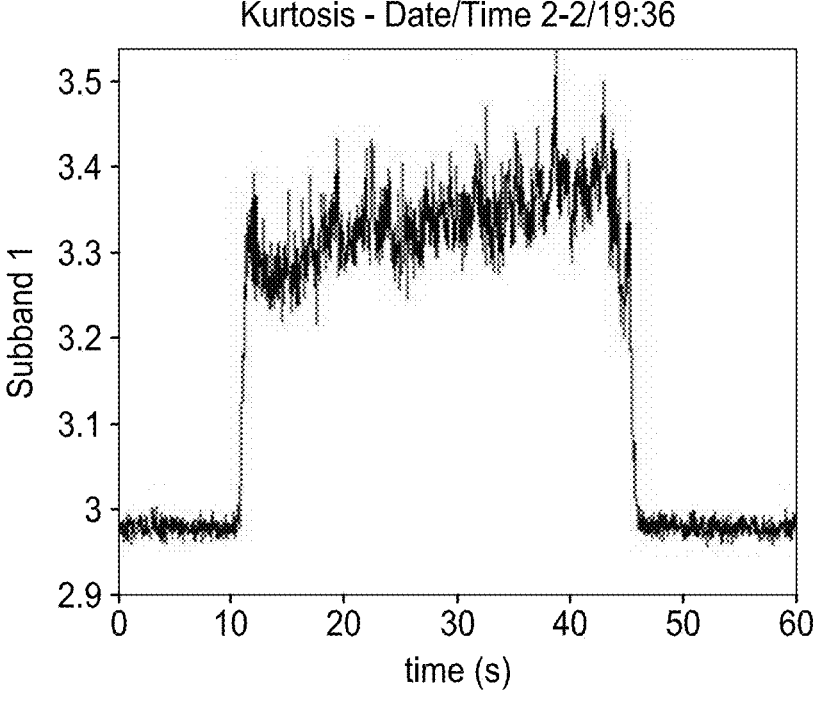

In FIG. 1A, a bell jar 10 is shown in which sand particles are mixed and caused to collide. FIG. 1B shows the graphical detection of non-thermal radiation over time caused by the sand particle collisions within the bell jar 10.

The collision of large objects such as satellites or rocket stages is expected to produce a cloud of debris containing numerous particles with radius ranging from 1 to 10 mm, moving at relative velocities which are a significant fraction of the orbital velocity of the large objects before the collision. The emission of non-thermal radiation by colliding debris can be estimated using dimensional analysis, as done by Renno et al. (2003) for colliding dust particles. Approximating the region where discharge occurs between a pair of colliding debris by a flat plate capacitor, the amount of non-thermal radiation emitted by a single discharge can be estimated. It follows from Gauss law that the charge in the contact region is $q=AE\epsilon$, where A is the contact area (assumed to be of the order of 10% of the area of the debris surface), E is the breakdown electric field, and $\epsilon \approx 8.85 \times 10^{-12}$ $C^2N^{-1}m^{-2}$ is the permittivity of free space. Since the charge an object can hold is limited by field emission and that the electric field necessary to produce field emission is $E_{FE} \approx 10^9$ $Vm^{-1}$, the maximum charge colliding debris with radius from 1 to 10 mm can hold after a collision is $q_{max} \approx 4\pi r^2 E_{FE}$ $\epsilon \approx 10^{-8}$-$10^{-6}$ C because charge transfer in particle collisions is large enough to be limited only by field emission. Thus, the electrostatic energy dissipated in a single discharge is $$W = \frac{1}{2}qEd,$$

where $q \approx q_{max}$, and $d \sim 15$ μm is the distance between debris when discharges occur. The energy emitted by electrostatic discharges is only a fraction of the energy dissipated. Assuming conservatively that like in lightning this fraction is of the order of 1%, we find that $W \approx 10^{-6}$-b $10^{-4}$ J. Since, electrostatic discharges have duration of less than 0.1 ms, the power emitted per debris collision is about $P \approx 10^{-2}$-1 W.

It follows from dimensional analysis that the number of collisions between debris is approximately $N_{pp} \approx n_1 n_2 v \pi r_1^2$, where $n_1$ is the number density of the larger debris, $n_2$ is the number density of the smaller debris, $v$ is the relative velocity of the debris, and $r_1$ is the radius of the larger debris. For a cloud of debris at altitudes between 700 and 1,000 km, where the concentration of catalogued objects peaks (Wright, 2009), the orbital velocity is about 7 km/s and therefore $v \approx 1$-3 km/s. This means that a debris cloud with volume concentration of $n_1 n_2 \approx 10$ could emit about 1 W of non-thermal radiation.

Figure 3:
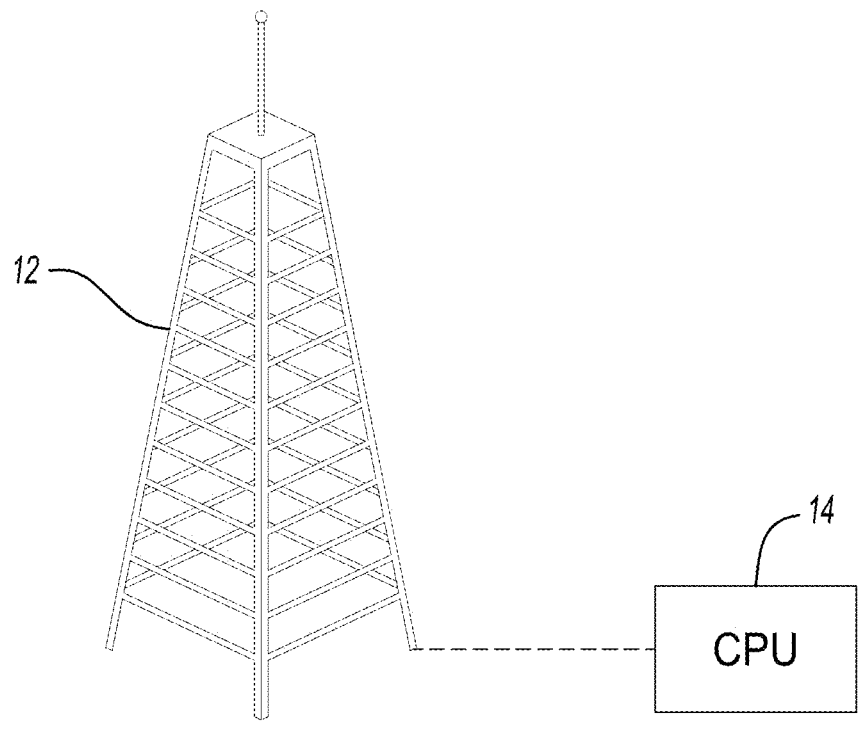
FIG. 3 is a schematic view of a method of detecting a cloud of space debris using non-thermal radiation detection via an antenna according to the principles of the present disclosure.
Figure 4:
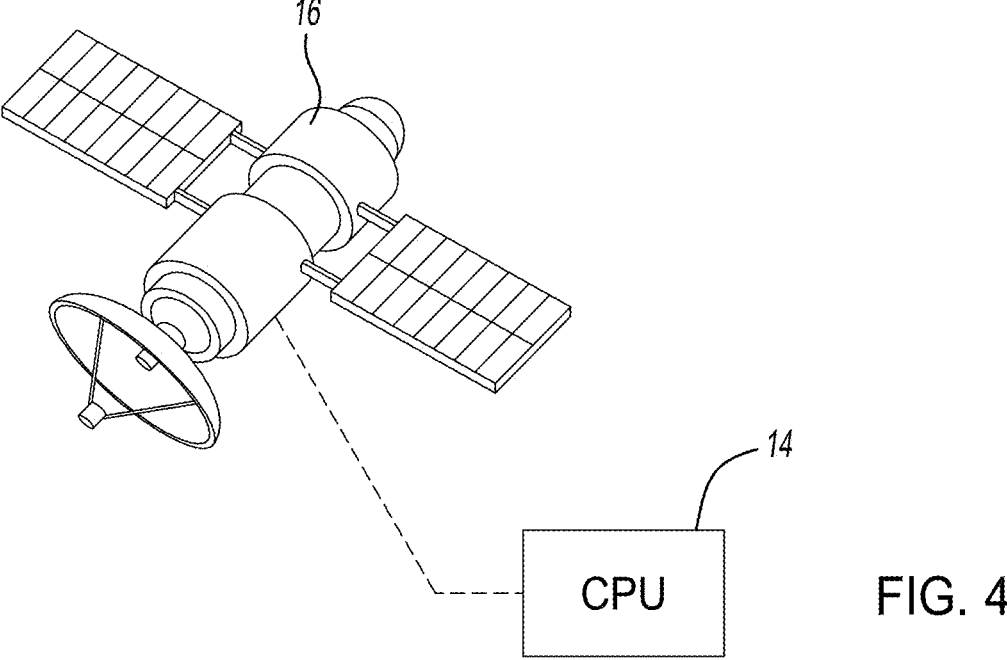
FIG. 4 is a schematic view of a method of detecting a cloud of space debris using infrared, visible light and UV light using an optical telescope.

The NTEM signals ranging from radio to optical wavelengths, the thermal radiation (TEM) signal, and NTEM ultraviolet (UV) signal generated by hypervelocity collisions are short, lasting only a few hundred nanoseconds, but can be extremely powerful even when generated by the collision of micron-size debris (e.g., Close et al., 2013; Goel et al., 2015; Renno et al., 2024). As shown in FIG. 3, the radio signals can be detected with either ground-based radio observatory systems or space-based radio receivers 12. The UV, optical and thermal signals can be detected either with ground-based telescopes 16 (see FIG. 4) such as the Magellan telescope (Johns et al., 2012) or space-based systems such as the telescope of the European Space Agengy (ESA) CHaracterising ExOPlanet Satellite (CHEOPS) Mission (e.g., Benz et al., 2021).

Communication systems such as the 70 m antennas of NASA's Deep Space Network (DSN) can detect signals of about $2\times10^{-16}$ W (−157 dBW) without error correction protocols. Thus, with reference to FIG. 3, the DSN and other antenna systems 12 can detect non-thermal radiation emitted not only by clouds of colliding debris, but also by single collisions between two debris. Radars and other communication systems with smaller antennas 12 can also be able to detect space debris based on the emission of non-thermal radiation. The antenna 12 can be a space antenna or on the ground. The signals detected by the antenna can be transmitted or otherwise delivered to a processor 14. The signals detected by the antenna and processed by the processor 14 can be used to determine a size of the debris and a location of the debris. The orbit direction and subsequent detection of the debris cloud can be used to detect and/or predict the track of the debris cloud.

Figure 2A:
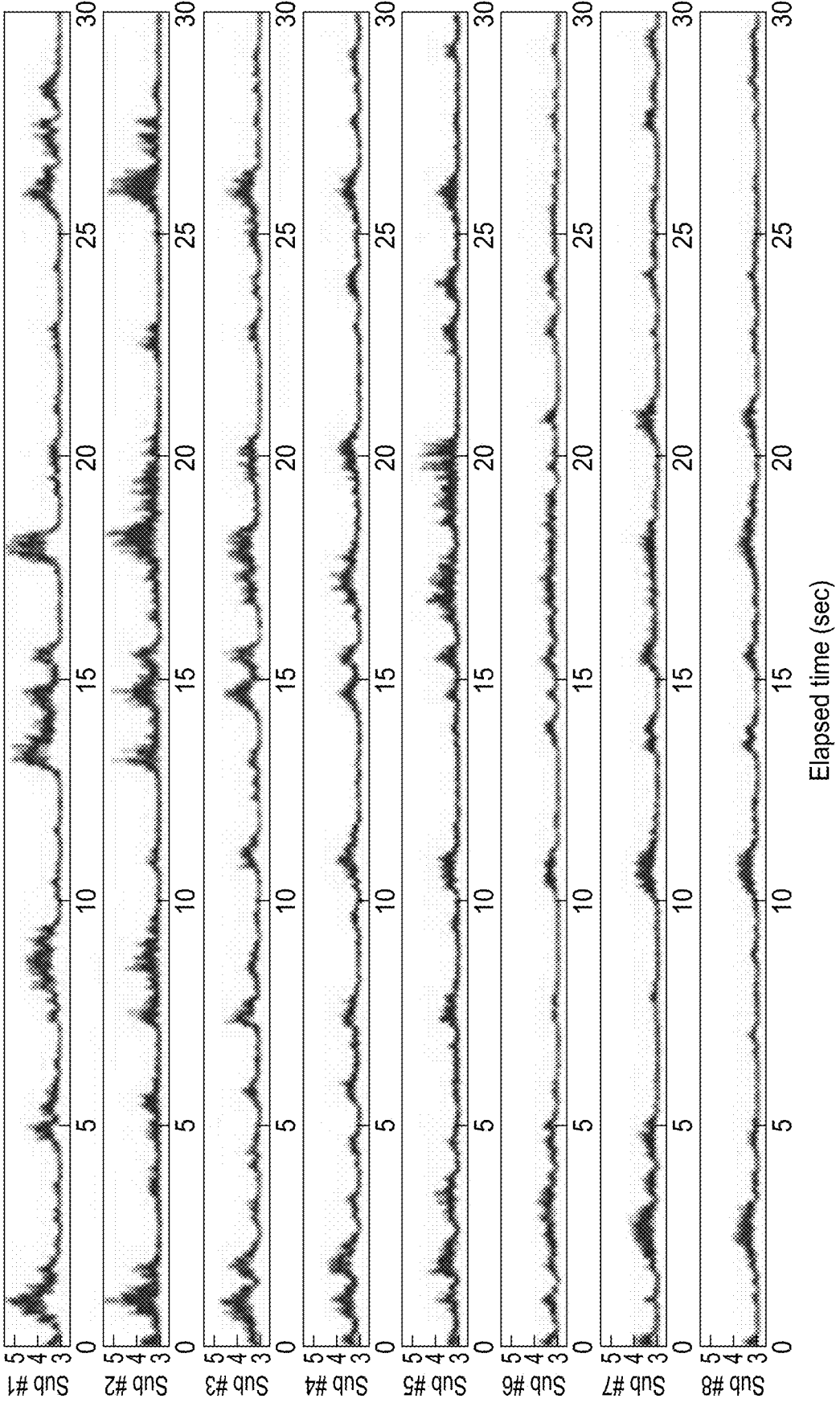
FIGS. 2A-2B illustrate a comparison between non-thermal (NTEM) radiation and radio frequency interference (RFI) signals while viewing Mars from earth.
Figure 2B:
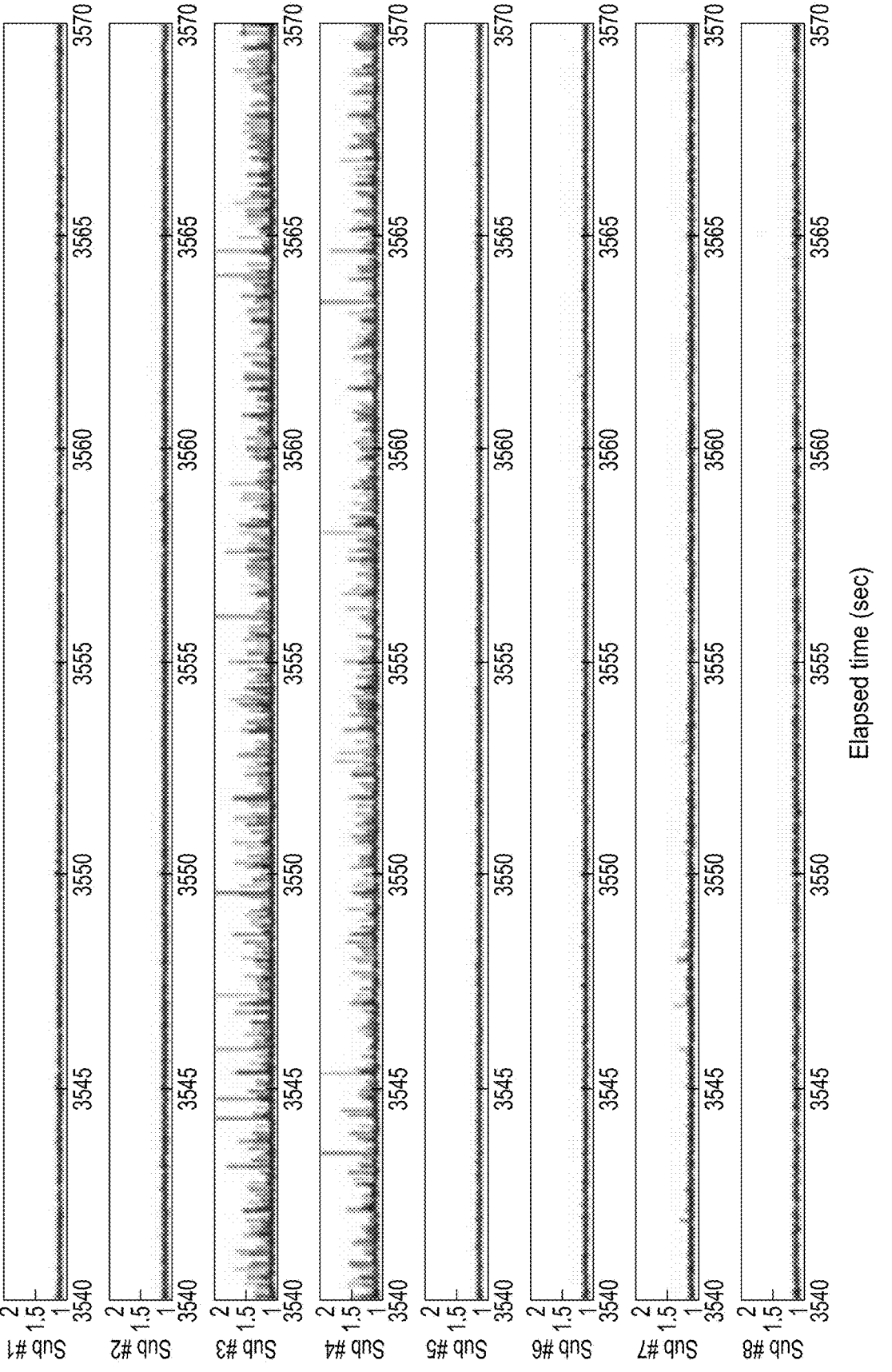

The charging in Martian dust storms appears to be analogous to that in space debris clouds because both are caused by the collision of solid particles with each other. As shown in FIGS. 2A-2B, the spectral distribution of the non-thermal radiation is unique and measurements in multiple frequency bands can be used by the processor 14 to distinguish it from other signals such as radio interference. Indeed, the temporal and spectral dependencies of non-thermal radiation generated by discharges between colliding particles of solid materials is unique and can be used to distinguish them from radio frequency interference (RFI) signals by the processor 14. Further, the processor 14 can process the electromagnetic radiation signal to calculate a power spectrum of the emission. The processor can use the the power spectrum to detect and track the space debris.

Measurements of both the power of the signal and its kurtosis can be used by the processor 14 to detect non-thermal radiation. The kurtosis is extremely sensitive to the presence of non-thermal radiation but is insensitive to variations in the intensity of the thermal radiation or in the gain of a radiometer system. Thus, the kurtosis can detect the presence of non-thermal radiation of much lower intensity than ordinary thermal radiation.

The optical debris detection system (FIG. 4) can be used in combination with the non-thermal radiation detection system (FIG. 3) to detect and/or to confirm a location and tracking direction of a detected debris cloud.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting and tracking colliding space debris, said method comprising:
   measuring electromagnetic radiation generated by the space debris colliding with each other or with larger objects and outputting an electromagnetic radiation signal;
   processing the electromagnetic radiation signal to distinguish it from other signals such as radio frequency interference (RFI) and outputting a detection signal; and
   using the detection signal to track the space debris.

2. The method for detecting and tracking colliding space debris according to claim 1, wherein processing the electromagnetic radiation signal includes calculating a power spectrum of the emission and using the power spectrum to detect and track the space debris.

3. The method for detecting and tracking colliding space debris according to claim 1, wherein processing the electromagnetic radiation signal includes calculating a kurtosis of the emission and using the kurtosis to detect and track the space debris.

4. The method for detecting and tracking colliding space debris according to claim 1, wherein measuring electromagnetic radiation generated by the space debris colliding with each other is detected by an antenna.

5. The method for detecting and tracking colliding space debris according to claim 1, wherein the detection signal is used to estimate a size of the space debris.

6. A method for detecting and tracking colliding space debris, said method comprising:
   measuring optical light generated by the space debris colliding with each other or with larger objects and outputting an optical signal;
   processing the optical signal to distinguish it from other signals and outputting a detection signal; and
   using the detection signal to track the space debris.

7. The method for detecting and tracking colliding space debris according to claim 6, wherein processing the optical signal includes detecting at least one of visible, infrared and UV light.

8. The method for detecting and tracking colliding space debris according to claim 6, wherein processing the optical signal includes calculating a kurtosis of the detection signal and using the kurtosis to detect and track the space debris.

9. The method for detecting and tracking colliding space debris according to claim 6, wherein measuring optical light generated by the space debris colliding with each other is detected by a telescope.

10. The method for detecting and tracking colliding space debris according to claim 6, wherein the detection signal is used to estimate a size of the space debris.

* * * * *